United States Patent [19]

Klatt

[11] Patent Number: 5,237,255
[45] Date of Patent: Aug. 17, 1993

[54] ELECTRIC MACHINE SYSTEM
[76] Inventor: Frederick Klatt, 30 Fox Run Rd., Bedford, Mass. 01730
[21] Appl. No.: 731,804
[22] Filed: Jul. 17, 1991
[51] Int. Cl.$^5$ .......................................... H02P 5/34
[52] U.S. Cl. ................................. 318/771; 318/732; 318/735
[58] Field of Search ............... 318/138, 168, 140, 151, 318/152, 153, 154, 254, 560, 605, 654, 659, 660, 771, 732, 735, 731; 307/85, 57; 310/112

[56] References Cited

U.S. PATENT DOCUMENTS

| | | | |
|---|---|---|---|
| 3,239,701 | 3/1966 | Cambell | 310/112 |
| 3,467,844 | 9/1969 | Bird | 318/168 |
| 4,459,530 | 7/1984 | Klatt | 318/732 |
| 4,528,485 | 7/1985 | Boyd | 318/138 |
| 4,543,505 | 9/1985 | Dittner | 318/140 |
| 4,634,950 | 1/1987 | Klatt | 318/732 |
| 4,978,900 | 12/1990 | Skawinski | 318/654 |
| 5,077,485 | 12/1991 | Rashid | 307/84 |

OTHER PUBLICATIONS

Standard Handbook for Electrical Engineers, Archer E. Knowlton, 1949, McGraw Hill Book Company pp. 78-87 and 1722-1729.
Sarma, Mulukutla "Electric Machines", 1985, Appendix B7 pp. 601-604.
Soviet Patents Abstracts, Section EI, Week 36, Oct. 14, 1981.
Conference Record IEEE-IAS-1985 Annual Meeting, Oct. 6, 1985.

Primary Examiner—William M. Shoop, Jr.
Assistant Examiner—John W. Cabeca
Attorney, Agent, or Firm—Wolf, Greenfield & Sacks

[57] ABSTRACT

An electric machine system includes a resonant switching system for selecting a resonant frequency of at least a portion of the circuit of the system. The electric machine system includes a first pair of windings for generating force to actuate a moving body and a second pair of windings for exciting the first pair of windings. The resonant switching system includes a resonant inductor and a resonant capacitor. The carrier signal used to excite one of the pairs of windings may have a frequency that is substantially equal to the resonant frequency of the circuit. Preferably, the air gap magnetic flux distribution for the pairs of windings are substantially alike. The electric machine system may employ a rotating body or alternatively may employ a linearly actuating body.

46 Claims, 9 Drawing Sheets

ELECTRIC MACHINE SYSTEM

FIELD OF THE INVENTION

The present invention relates to electric machine systems.

DESCRIPTION OF THE PRIOR ART

U.S. patent application Nos. 3,467,844, 3,239,701 and 3,956,629 disclose basic synchronous machines in which a rotor of a motor is supplied with a direct current (DC) power supply so as to avoid the use of slip rings and brushes. The synchronous machines of those patents, however, still provide synchronous operation but only at one speed.

Previous systems that have employed a second rotor/stator combination have generally not been multiphase systems. Moreover, they have generally been rectified to supply DC to the rotor. U.S. Pat. Nos. 4,459,530 and 4,634,950 disclose electric rotating apparatus adapted to function as a motor or a generator. The apparatus described therein include two balanced phase electric machines that can be either a balanced phase synchronous motor or a power generator.

It is an object of the present invention to provide an improved electric machine system that is readily adapted for use as an electric motor or electric generator.

SUMMARY OF THE INVENTION

Although rotating concepts are used to explain the workings of this invention, linear concepts are equally applicable. In the linear case, the word "rotor" should be replaced by "moving body", and the word "rotating" should be replaced by "moving". The foregoing objects is realized by an electric machine system which has linear as well as rotating applications. This system includes a rotor and a stator that encircles the rotor. The system also includes a circuit having a first pair of windings that are separated by an air gap for generating a torque to rotate the rotor. The pair of windings include windings on the rotor and windings on the stator. The circuit also includes a second pair of windings that are, likewise, separated by an air gap. This second pair of windings, however, serves to alter excitation of the first pair of windings. It, like the first pair of windings, has windings on the rotor and windings on the stator. Another component of the circuit is a modulator that supplies at least one modulation carrier signal to one of the windings of the second pair of windings. Lastly, this circuit includes a demodulator for demodulating the carrier signal to produce demodulated information signals. These demodulator information signals are forwarded to one of the windings of the first pair of windings for their electrical excitation and power.

The electric machine system includes a means for providing alternating current power to the modulator and to the windings on the stator of the first pair of windings. Preferably, the electric machine system also includes a resonant switching system for controlling the switching on and off of the power. The resonant switching system may include a resonant inductor and a resonant capacitor on the rotor. It may also include an additional resonant inductor and a capacitor on the stator. Preferably, the resonant switching system further includes a zero crossing detector that detects the zero crossing point of voltage across the resonant capacitor. In addition, it should include a switching means for switching the power on and off in response to the zero crossing detector. Also, the resonant switching system may include means of predicting the zero crossing point for voltage or current switching from previous switching history and thereby, cancelling switching delays of the circuit components.

In accordance with one embodiment the modulator provides modulated carrier signals that have a frequency selected to lie in a range substantially equal to or about the resonance frequency of the circuit in the electric machine system. By selecting the carrier frequency to lie in such a range, the system may compensate for the power factor of the machine. In particular, it neutralizes the effects and leakage inductance. Further, the system can be adjusted so as to compensate for parasitic impedance.

It is also preferred that the electric machine system configure the first pair of windings to the second pair of windings so that the resulting air gap magnetic flux distribution for the second pair of windings when excited is substantially like the air gap magnetic flux distribution for the first pair of windings when excited. In other words, it is preferred that the first pair of windings and second pair of windings be electromagnetic mirror images of each other.

Additional noteworthy features of the electric machine system of the present invention are that the modulator and demodulator may be located on either the rotor or stator. The only applicable rule is that they must be located on opposite elements (i.e., they cannot both be located on the rotor or both located on the stator). Furthermore, when resonant switching is utilized, either a series place resonance approach or a parallel place resonance approach may be adopted. A final noteworthy feature for the present invention is that the modulator may output multiple carrier signals that are phase shifted relative to each other. These multiple carrier signals are demodulated into corresponding information signals and the resulting information signals are forwarded to respective phase windings of the first pair of windings.

DETAILED DESCRIPTION OF A PREFERRED EMBODIMENT

A parallel connected embodiment of the present invention will be described hereinafter with reference, initially, to FIG. 1. The electric machine system of the present invention includes a rotor 10 surrounded by a stator 12. The rotor 10 rotates about a central axis 11 shown as a broken line in FIG. 1. The stator 12 includes three stator phase windings 16 which are shown as being connected in a wye configuration in FIG. 1. These windings 16 are excited by high frequency modulated signals output from the modulator 14 over connections 17 leading to the winding 16. The modulator is powered by a direct current source which is connected to the modulator 14 by connection 20. Similarly, it may be connected to an alternating current source. The modulator receives three alternating current signals, denoted as phase 1, phase 2 and phase 3 signals, respectively, over connections 22, 24 and 26.

The stator 12 also includes stator phase windings 28. The windings 28 comprise three phase windings 28a, 28b and 28c connected in a wye configuration. Each respective winding 28a, 28b and 28c is connected to a separate one of the three alternating current sources phase 1, phase 2 and phase 3. In particular, winding 28a is connected to the phase 1 current source through connection 30, and winding 28b is connected to the phase 2 current source through connection 32. Lastly, winding 28c is connected to the phase 3 current source through connection 34. The rotor 10 also includes two sets of windings 36 and 38. The windings 36 are of the same configuration and size as the windings 16 on the stator 12. Likewise, the windings 38 are matched in configuration and size to the windings 28 on the stator 12.

The above described components can be divided into two categories. The first category is the power generator and motor (denoted as PGM) which is the mechanical power and torque producing entity that produces torque to drive the rotor. The PGM includes windings 28 and 38. It may be similar to a conventional three phase wound rotor induction electric machine. It does not, however, include the traditional means of rotor excitation, nor does it include sliding electrical contacts. Furthermore, it does not include a slip ring body.

The second category of components is the rotor excitation generator (denoted as REG) that electrically excites the rotor windings 38 of the PGM. The components that constitute the REG are modulator 14, windings 16, windings 36 and demodulator 40. The windings 36 and 16 form a high frequency rotating transformer which will be referred to hereinafter as HFRT. How the REG excites the windings 38 of the PGM will be described below in more detail.

The general operation of the electric machine system of FIG. 1 will be described hereinafter with reference to FIG. 1. The alternating current signals: phase 1, phase 2 and phase 3, cause excitation of windings 28 on the stator 12. This excitation of the windings 28 also causes excitation of the windings 38 positioned on the rotor 10. The field resulting from the excitation creates a torque which causes the rotor 10 to rotate as is conventionally known for three phase wound rotor induction electric motors. This electric machine system, however, differs from conventional system in that it includes the REG portion of the system.

The REG portion of the system may serve to step up or step down the excitation voltage in the windings 38, so as to provide a higher dynamic range of rotor speeds. This stepping up or stepping down is realized by applying the modulated signal from modulator 14 to the REG windings 16 on the stator 12. The excitation of these winding 16, in turn, brings about excitation of the windings 36 on the rotor. The signal resulting from the excitation in the windings 36 passes to the demodulator 40. This modulated signal is comprised of a carrier signal which carries the encoded modulated signals. In particular, the carrier signal carries three separate modulator signals whose phase of modulation are 120° apart so as to provide balanced phase operation. Hence, one of the respective modulator signals excites each of the respective phase windings in the windings 36.

The demodulator demodulates the carrier signal so that only the information signals encoded in the carrier signal are passed to windings 38. It should be appreciated that the information signals propagate electrical power as well as encoded information. These information signals alter the excitation of windings 38. This alteration of the excitation of windings 38 may cause the above described stepping up or stepping down of rotor speed. Further, the electrical frequency and phase of the stator modulation are resolved into rotor modulation whose frequency and phase is the function of the electrical frequency and phase of the stator modulation as well as the rotor mechanical speed and position.

Figure 1:
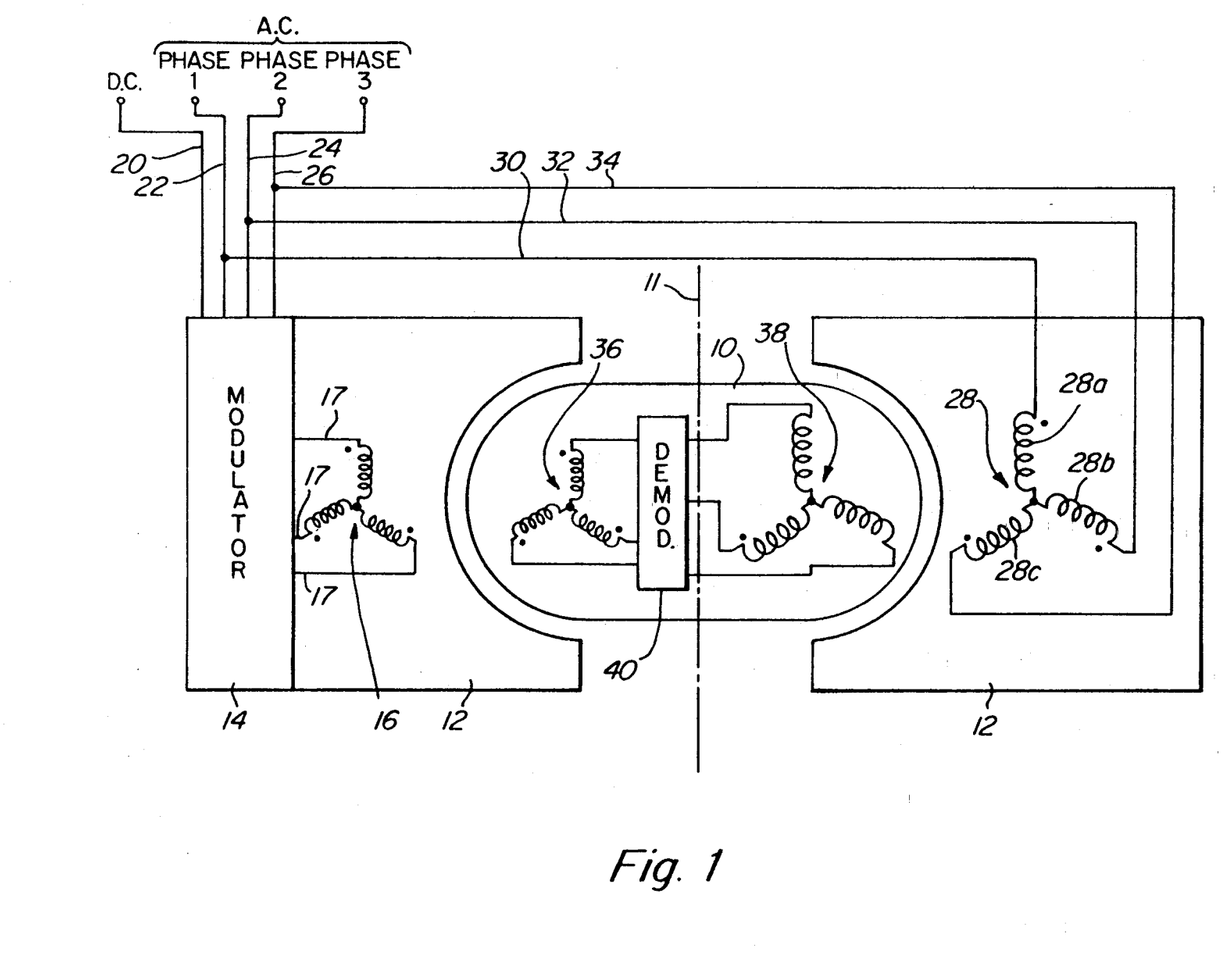
FIG. 1 is an electrical schematic of the electric machine system of the present invention.

Although the modulator 14 is shown o the stator 12 and the demodulator 40 is shown on the rotor 10 in FIG. 1, it should, nevertheless, be appreciated that these components 14 and 40 may be reversed so that the modulator is on the rotor and the demodulator is on the stator. In addition, although the above discussion focusses on the use of a single carrier signal, it should be appreciated that multiple carrier signals may be used. Specifically, multiple carrier signals that are balanced multiple phases may be used. In such a case, each winding of the three phase HFRT is driven by a respective carrier signal. The modulation of the carrier signals would remain phase shifted.

Figure 2:
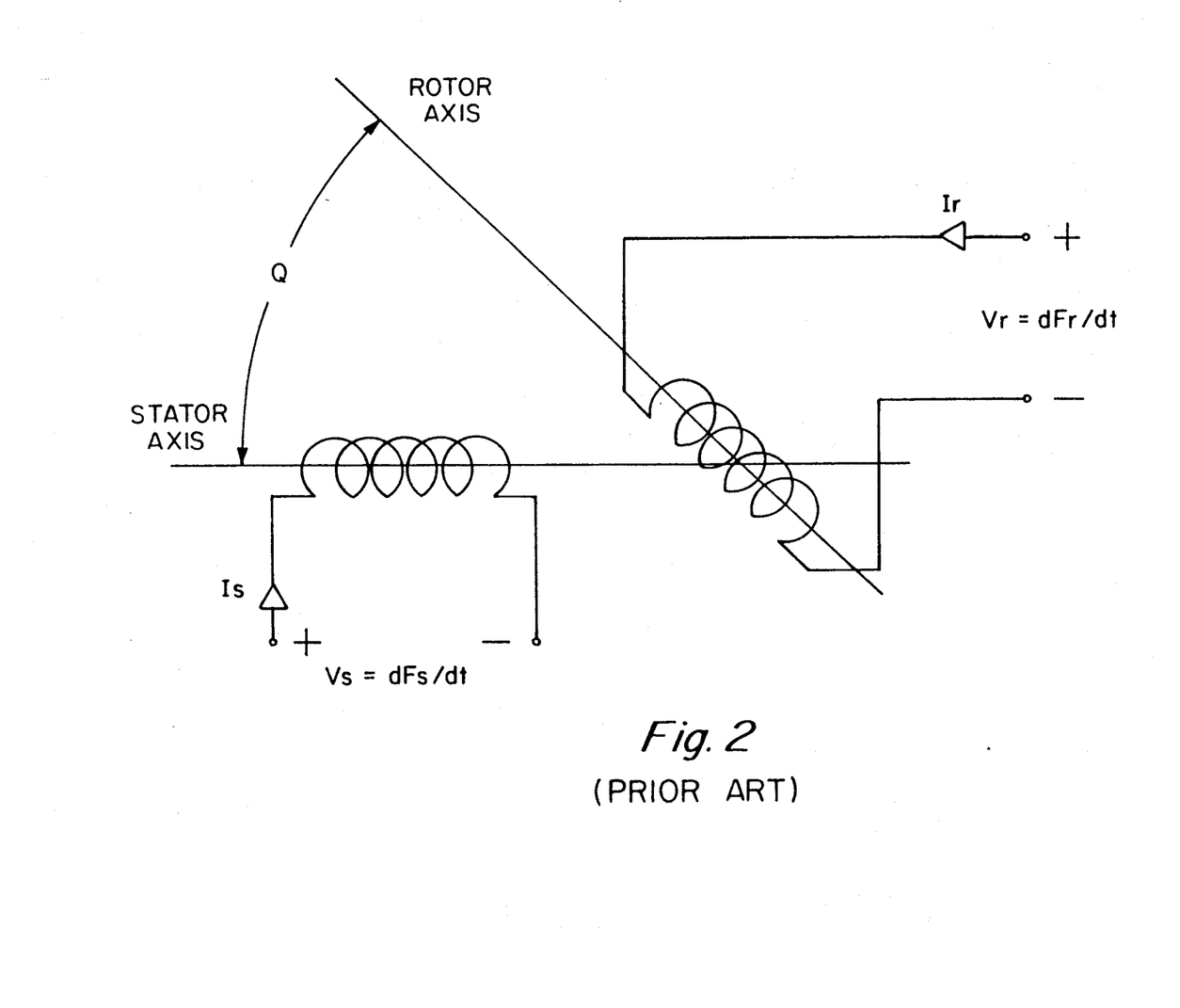
FIG. 2 is an electrical schematic of a conventional single phase rotating electric machine.

The concepts of the classical, smooth airgap balanced two phase rotating electric machine will now be discussed to develop a mathematical analysis of the present invention. This analysis will help to explain several novel features of the present invention. Initially, it is helpful to begin with a simple single phase rotation electric machine. FIG. 2 is a schematic of such a simple single phase rotating electric machine. The machine is referred to as a smooth airgap machine so as to specify that the magnetic path seen by each winding is independent of rotor position.

The generalized Flux Relations for this type of an electric machine are:

$$F_s = L_s I_s(t) + M_{sr}(Q(t))I_r(t); \qquad (eq. 1)$$

$$F_r = L_r I_r(t) + M_{sr}(Q(t))I_s(t); \qquad (eq. 2)$$

where:
t is time;
$F_s$ is the total flux linkage of the stator windings;
$F_r$ is the total flux linkage of the rotor windings;
$L_r$ is the self-inductance of the rotor windings;
$L_s$ is the self-inductance of the stator windings;
Q(t) is the instantaneous angular displacement between the axis of the stator and rotor windings;

$M_{sr}(Q(t))$ is the mutual inductance between the rotor and stator windings;

$I_r(t)$ and $I_s(t)$ are the rotor and stator port currents.

The generalized terminal relations for the simple single phase electric machine are:

The Terminal Current Relations:

$$I_s(t) = I_s\text{COS}(W_s t + Q_s); \quad \text{(eq. 3)}$$

$$I_r(t) = I_r\text{COS}(W_r t + Q_r); \quad \text{(eq. 4)}$$

where:

$I_s(t)$ represents the stator port current;
$I_r(t)$ represents the rotor port current;
$I_s$ is the amplitude of the stator current;
$I_r$ is the amplitude of the rotor current;
$W_s$ is the angular frequency of the stator current;
$Q_s$ is the angular phase shift relative to the utility source;
$W_r$ is the angular frequency of the rotor current;
$Q_r$ is the angular phase shift relative to the utility source; t is the time;
$\text{COS}(W_s t + Q_r)$ is the cosine of the term $(W_s t + Q_r)$.

The Terminal Voltage Relations:

$$V_s(t) = (d/dt)(F_s); \quad \text{(eq. 5)}$$

$$V_r(t) + (d/dt)(F_r); \quad \text{(eq. 6)}$$

where:

$V_s(t)$ is the stator port voltage;
$V_r(t)$ is the rotor port voltage;
$F_s$ is the stator magnetic flux;
$F_r$ is the rotor magnetic flux;
$(d/dt)(F_s)$ is the derivative of the function $F_s$ with respect to time.

The Torque Relation:

$$\text{Torque} = I_r(t)I_s(t)(d/dQ)(M_{sr}); \quad \text{(eq. 7)}$$

where:

$M_{sr}$ represents the mutual inductance between the stator and rotor;

$(d/dQ)(M_{sr})$ is the derivative of the function $M_{sr}$ with respect to the angular displacement.

Figure 3:
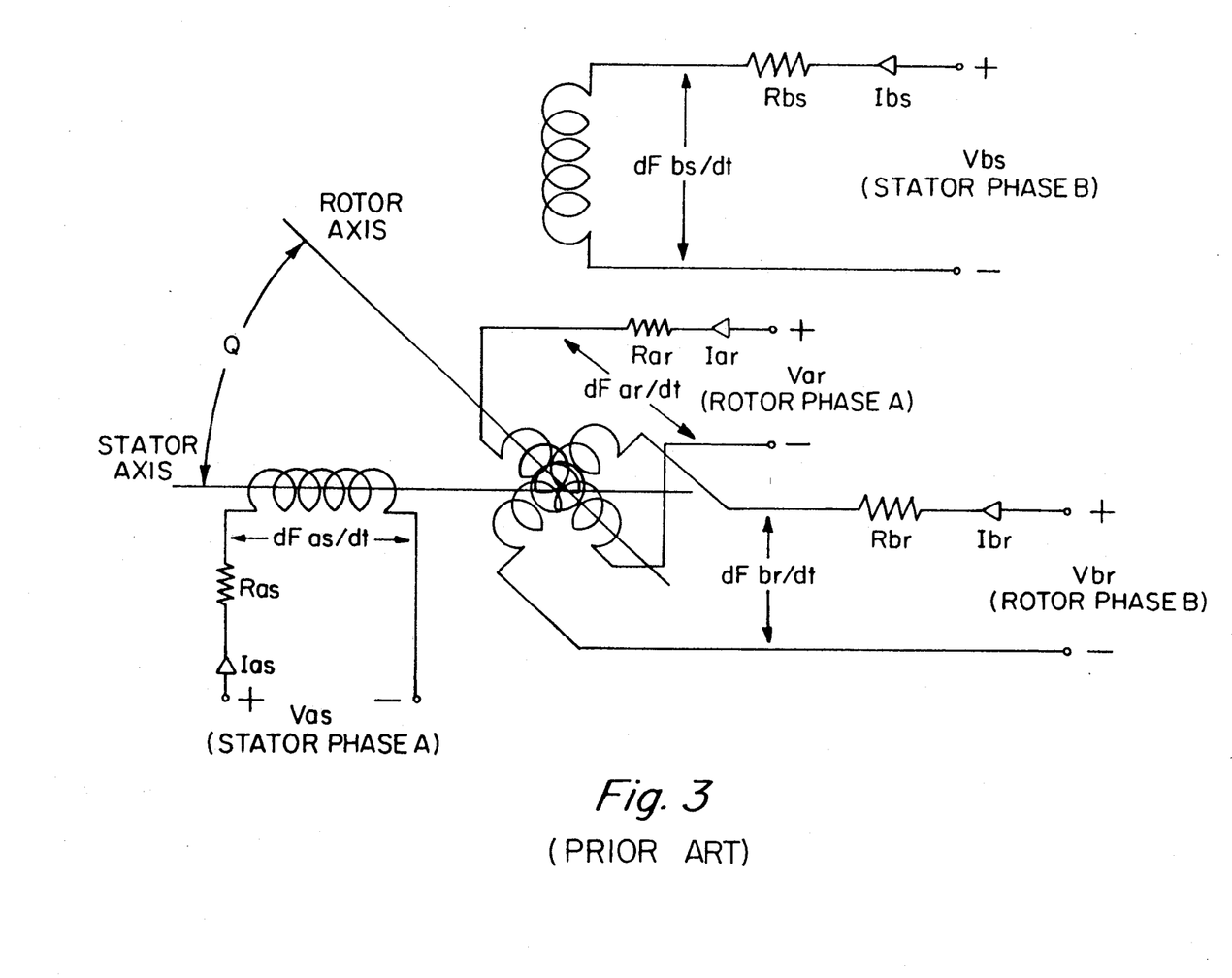
FIG. 3 is an electrical schematic of a conventional balanced two phase, smooth air gap rotating electric machine.

From these relations for a single phase machine, the relations for a two phase smooth airgap, rotating electric machine (like that of FIG. 3) may be derived. By modifying the generalized relations for the single phase machine, the terminal relations for the two phase machine are a follows:

The Terminal Voltage Relations:

$$V_{as} = I_{as}R_{as} + (d/dt)(F_{as}); \quad \text{(eq. 8)}$$
$$V_{bs} = I_{bs}R_{bs} + (d/dt)(F_{bs}); \quad \text{(eq. 9)}$$
$$V_{ar} = I_{ar}R_{ar} + (d/dt)(F_{ar}); \quad \text{(eq. 10)}$$
$$V_{br} = I_{br}R_{br} + (d/dt)(F_{br}); \quad \text{(eq. 11)}$$

The Terminal Current Relations (balanced):

$$I_{as} = I_s\text{COS}(W_s t + Q_s); \quad \text{(eq. 12)}$$
$$I_{bs} = I_s\text{COS}(W_s t + Q_s); \quad \text{(eq. 13)}$$
$$I_{ar} = I_s\text{COS}(W_r t + Q_r); \quad \text{(eq. 14)}$$
$$I_{br} = I_s\text{COS}(W_r t + Q_r); \quad \text{(eq. 15)}$$

The Terminal Magnetic Flux Relations:

$$F_{as} = L_{as}I_{as} + M_{ar}\text{COS}(Q)I_{ar} - M_{br}\text{SIN}(Q)I_{br}; \quad \text{(eq. 16)}$$

$$F_{bs} = L_{bs}I_{bs} + M_{br}\text{SIN}(Q)I_{ar} + M_{br}\text{COS}(Q)I_{br}; \quad \text{(eq. 17)}$$

$$F_{ar} = L_{ar}I_{ar} + M_{as}\text{COS}(Q)I_{as} + M_{bs}\text{SIN}(Q)I_{bs}; \quad \text{(eq. 18)}$$

$$F_{br} = L_{br}I_{br} - M_{as}\text{COS}(Q)I_{as} + M_{bs}\text{COS}(Q)I_{bs}; \quad \text{(eq. 19)}$$

The Torque Relation:

$$T_o + I_s(t)I_r(t)(d/dQ)(\text{mutual inductance}) = \quad \text{(eq. 20)}$$
$$M[(I_{ar}I_{bs} - I_{br}I_{as})\text{COS}(Q) - (I_{ar}I_{as} + I_{br}I_{bs})\text{SIN}(Q);$$

where:

$(d/dQ)(\text{mutual inductance})$ is the derivative of the mutual inductance with respect to the displacement.

$W_s$ is the angular frequency of the electrical power source

Q is the instantaneous angular position between the electromechanical axis of the rotor and stator windings.

$$Q = W_m t + Q_1;$$

where:

$W_m$ is the "apparent" angular mechanical speed (which will be explained below) of the rotor;

t is the time;

$Q_1$ is the relative angular position between the rotor and stator windings at a given angular velocity and time.

$R_{as}$, $R_{bs}$, $R_{ar}$, $R_{br}$ are the losses (eddy current losses, resistive losses, etc.) associated with each winding arrangement. Since the machine is considered to be phase balanced, $R_{as}$ and $R_{bs} = R_s$; $R_{ar}$ and $R_{br} = R_r$ $M_{ar}\text{COS}(Q)$, $M_{br}\text{SIN}(Q)$, $M_{as}\text{COS}(Q)$, and $M_{bs}\text{SIN}(Q)$, represent the mutual inductance (magnetic coupling) of each winding with any other non quadrature winding (by definition, quadrature windings have no mutual magnetic path). The mutual inductances are a function of position. Since this discussion concerns a smooth airgap, balanced phase electric machine $$M_{ar} = M_{br} = M_{as} = M_{bs} = N_s N_r L_m;$$

where:

$N_s$ is the number of winding turns on each stator winding;

$N_r$ is the number of winding turns on each rotor winding;

$L_m$ is related to the permeance (the inverse of the core reluctance) of the magnetic circuit mutually linking a rotor and stator winding.

Permeance or its inverse, reluctance, is a function of the magnetic permeability of the magnetic material (including the air gap) and the "physical volume" (and other physical dimensions) of the mutual magnetic path linking the electrical winding.

$L_{br}$ and $L_{ar}$ are the self inductances of the rotor windings. $L_{bs}$ and $L_{as}$ are the self-inductances of the stator windings. Because a smooth airgap machine is being considered, the self-inductances are not a function of rotor position and can be factored into two components.

One component, $L_m$, is related to the permeance of the mutual magnetic path and the other component, $L_{1x}$ (where x is "r" or "s" indicating the rotor and stator, respectively), is related to the permeance of the remaining magnetic circuits (other than the magnetic circuit attributed to $L_m$).

$$L_{as} = L_{bs} = N_s N_s L_m + N_s N_s L_{1s}$$

$$L_{ar} = L_{ar} = N_r N_r L_m + N_r N_r L_{1r}$$

Leakage inductance contributes nothing to torque development; yet, it lowers the power factor of the electric machine. Hence, in the torque producing entity of any electric machine, leakage inductance should be kept to a minimum. Unfortunately, all electric machines require an airgap between their moving and stationary bodies which is the major cause of leakage inductance for such machines. As will be shown, the electric machine system of this invention can cancel its leakage inductance.

By solving the relations of equations 8–11 and letting $(W_r = W_s - W_m)$, the Terminal Voltage Relations and the Torque Relation for the two phase machine are:

$$V_{as} = -[W_s L_s I_s \text{SIN}(W_s t + Q_s) + \quad (\text{eq. 21})$$
$$W_s M I_r \text{SIN}(W_s t + Q_r + Q_1)] + R_{as} I_s \text{COS}(W_s t + Q_s);$$

$$V_{bs} = W_s L_s I_s \text{COS}(W_s t + Q_s) + \quad (\text{eq. 22})$$
$$W_s M I_r \text{COS}(W_s t + Q_r + Q_1) + R_{as} I_s \text{SIN}(W_s t + Q_s);$$

$$V_{ar} = -[W_r L_r I_r \text{SIN}(W_r t + Q_r) + \quad (\text{eq. 23})$$
$$W_r M I_s \text{SIN}(W_r t + Q_s - Q_1)] + R_{ar} I_r \text{COS}(W_r t + Q_r);$$

$$V_{br} = W_r L_r I_r \text{COS}(W_r t + Q_r) + \quad (\text{eq. 24})$$
$$W_r M I_s \text{COS}(W_r t + Q_s - Q_1)] + R_{ar} I_r \text{SIN}(W_r t + Q_r);$$

$$\text{Torque} = \quad (\text{eq. 25})$$
$$M I_r I_s ([\text{COS}(W_r t + Q_r)\text{SIN}(W_s t + Q_s) -$$
$$\text{SIN}(W_r t + Q_r)\text{COS}(W_s t + Q_s)]\text{COS}(Q) -$$
$$[\text{COS}(W_r t + Q_r)\text{COS}(W_s t + Q_s) +$$
$$\text{SIN}(W_r t + Q_r)\text{SIN}(W_s t + Q_s)]\text{SIN}(Q))$$
$$= M I_r I_s \text{SIN}[(W_s - W_r - W_m)t + Q_s - Q_r - Q_1];$$

As indicated in equation 25, constant (non-pulsating) torque can only be generated when:

$$(W_s - W_r - W_m) = 0; \quad (\text{eq. 26})$$

Under this condition, the moving magnetic field of the rotor and the moving magnetic field of the stator are synchronized. As a result:

$$\text{Torque} = M I_r I_s \text{SIN}(Q_s - Q_r - Q_1); \quad (\text{eq. 27})$$

When the relations of equations 21, 22, 23 and 24 were developed earlier, $W_r$ was equated as follows:

$$W_r = W_s - W_m;$$

and the relation of equation 26 is satisfied.

In more general terms, the relation of equation 26 suggests that the electrical frequency of the rotor must be equal to the electrical frequency of the stator less the mechanical frequency (velocity) of the rotor for constant torque to be developed.

The term, $W_m$, in the relation of equation 26 is related to the electrical or magnetic angular velocity of the rotating magnetic field and not the "true" mechanical angular velocity of the rotor. Hence $W_m$ was previously referenced as the "apparent" mechanical angular velocity. The relationship between the "apparent" mechanical angle ($Q_e$) and the mechanical angle $Q_m$) is:

$$Q_e = (P/2)Q_m;$$

here:
P is the number of electrical (magnetic) poles.
Therefore, equation 26 becomes:
$$W_m = (2/P)(W_s - W_r); \quad (\text{eq. 28})$$

where $W_m$ of equation 28 is the "true" mechanical angular displacement.

The PGM follows an analysis similar to the analysis of the two phase machine. Its terminal relations are as follows:

PGM Terminal Current Relations (balanced):

$$I_{pas} = I_s \text{COS}(W_s t + Q_s); \quad (\text{eq. 29})$$
$$I_{pbs} = I_s \text{SIN}(W_s t + Q_s); \quad (\text{eq. 30})$$
$$I_{par} = I_r \text{COS}(W_r t + Q_r); \quad (\text{eq. 31})$$
$$I_{pbr} = I_r \text{SIN}(W_r t + Q_r); \quad (\text{eq. 32})$$

PGM Terminal Voltage Relations:

$$V_{pas} = -[W_s L_s I_s \text{SIN}(W_s t + Q_s) + \quad (\text{eq. 33})$$
$$W_s M I_r \text{SIN}(W_s t + Q_r + Q_1)] + R_s I_s \text{COS}(W_s t + Q_s);$$

$$V_{pbs} = W_s L_s I_s \text{COS}(W_s t + Q_s) + \quad (\text{eq. 34})$$
$$W_s M I_r \text{COS}(W_s t + Q_r + Q_1) + R_s I_s \text{SIN}(W_s t + Q_s);$$

$$V_{par} = -[W_r L_r I_r \text{SIN}(W_r t + Q_r) + \quad (\text{eq. 35})$$
$$W_r M I_s \text{SIN}(W_r t + Q_s - Q_1)] + R_r I_r \text{COS}(W_r t + Q_r);$$

$$V_{pbr} = W_r L_r I_r \text{COS}(W_r t + Q_r) + \quad (\text{eq. 36})$$
$$W_r M I_s \text{COS}(W_r t + Q_s - Q_1) + R_r I_r \text{SIN}(W_r t + Q_r);$$

PGM Frequency Relation:

$$(W_s - W_r - W_m) = 0; \quad (\text{eq. 37})$$

PGM Torque Relation:
$$\text{Torque} = M I_r I_s \text{SIN}(Q_s - Q_r - Q_1); \quad (\text{eq. 38})$$

where:
$W_s$ is the electrical angular frequency of the power supply;
$W_r$ is the electrical angular frequency of the rotor;
$W_m$ is the mechanical angular frequency of the rotor;
$Q_s$ is the electrical angular displacement of the stator signal;
$Q_r$ is the electrical angular displacement of the rotor signal;
$Q_1$ is the mechanical angular displacement of the rotor;
M is the mutual inductance of the PGM;
$L_s$ is the stator inductance of the PGM;
$R_r$ and $R_s$ are the rotor and stator electrical resistances respectively.

Figure 4:
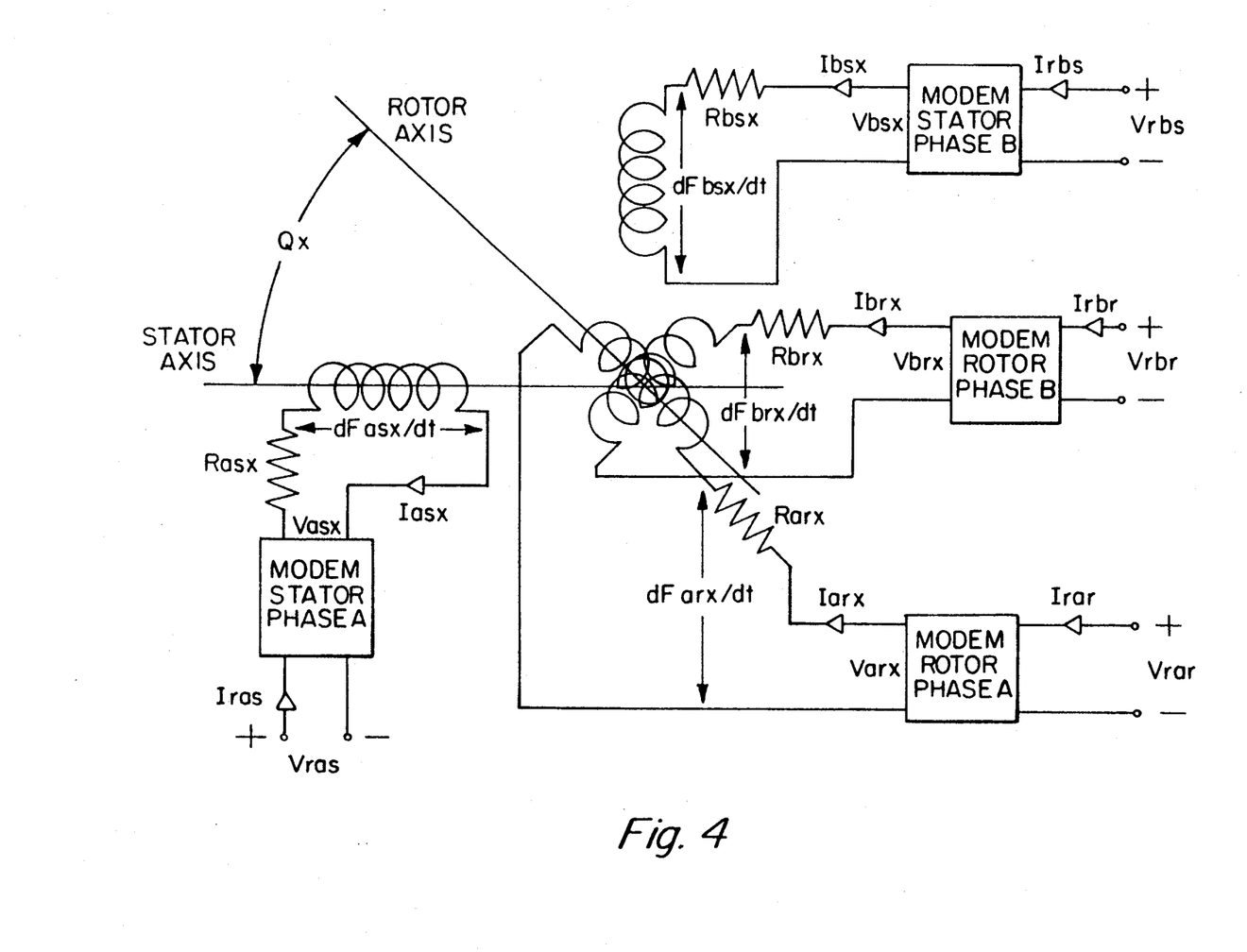
FIG. 4 is an electrical schematic of the rotor excitation generator of the present invention.

The PGM entity of this invention is the torque producing entity. Accordingly, its leakage inductance (air gap) should be made as small as possible. The REG is shown schematically in FIG. 4. The discussion that follows will focus on the relations for it. For mathematical simplicity, the discussion that follows assumes Double Sideband Suppressed-Carrier Amplitude Modulation (DSB). The envelope of the modulated signal is proportional to the magnitude of x(t), $|x(t)|$; where x(t) is the modulation. Hence, both the negative and positive frequency signatures of the modulation propagate on the carrier. Whenever the modulation signal crosses zero, the modulated wave has a phase reversal. By sampling the modulated signal at the carrier frequency and being aware of the phase reversal of the modulation envelope (a demodulation technique known as Synchronous Balanced Modulation/Demodulation), full recovery of the modulation signal is assured.

The Terminal Current Relations to the REG modem are:

$$I_{ras} = I_{sx}\text{COS}(W_s t + Q_{sx}); \quad \text{(eq. 39)}$$
$$I_{rbs} = I_{sx}\text{SIN}(W_s t + Q_{sx}); \quad \text{(eq. 40)}$$
$$I_{rar} = I_{rx}\text{COS}(W_r t + Q_{rx}); \quad \text{(eq. 41)}$$
$$I_{rbr} = I_{rx}\text{SIN}(W_r t + Q_{rx}); \quad \text{(eq. 42)}$$

After modulation, the Terminal Current Relations of the High Frequency Rotating Transformer (HFRT) are:

$$I_{asx} = I_{sx}\text{COS}(W_s t + Q_{sx})\text{SIN}(W_x t); \quad \text{(eq. 43)}$$
$$I_{bsx} = I_{sx}\text{SIN}(W_s t + Q_{sx})\text{SIN}(W_x t); \quad \text{(eq. 44)}$$
$$I_{arx} = I_{sx}\text{COS}(W_r t + Q_{rx})\text{SIN}(W_x t); \quad \text{(eq. 45)}$$
$$I_{rbr} = I_{sx}\text{SIN}(W_r t + Q_{rx})\text{SIN}(W_x t); \quad \text{(eq. 46)}$$

where:

$W_s$ is the angular frequency of the modulation (it is equal to the angular frequency of the power source supplying the PGM, i.e. (60 hz)(2)(PI) radians (where PI is equal to 3.14 two digits) and is generally fixed in time;

$W_x$ is the angular frequency of the carrier of the modulation. It is at least an order of magnitude larger than $W_s$.

$$W_x >> W_s;$$

The development of the HFRT Terminal Voltage Relations is similar to the development of the PGM Terminal Voltage Relations. Therefore, only one phase of the HFRT will be discussed below.

The Flux relation for one phase of the HFRT is:

$$F_{asx} = L_{sx}I_{asx} + M_x\text{COS}(Q_x)I_{arx} - M_x\text{SIN}(Q_x)I_{brx}; \quad \text{(eq. 47)}$$

where:

$Q_x$ is the instantaneous angular position between the electromechanical axes of the rotor and stator windings:

$$Q_x = W_m t + Q_2$$

where:

$W_m$ is the angular speed of the rotor; t is time;

$Q_2$ is the angular position between the rotor and stator windings at a given angular velocity and time;

After substituting equations 42 through 46 into equation 47, $F_{asx}$ becomes:

$$F_{asx} = L_{sx}I_{sx}\text{COS}(W_s t + Q_{sx})\text{SIN}(W_x t) +$$

$$M_x I_{rx}\text{COS}(W_s t + Q_{rx} + Q_2)\text{SIN}(W_x t);$$

The Voltage Relation due to the changing flux of the HFRT is:

$$V_{asx} = (d/dt)(F_{asx}) = +L_{sx}I_{sx}W_x\text{COS}(W_s t + Q_{sx})\text{COS}(W_x t) -$$

$$L_{sx}I_{sx}W_s\text{SIN}(W_s t + Q_{sx})\text{SIN}(W_x t) +$$

$$M_x I_{rx}W_x\text{COS}(W_s t + Q_{rx} + Q_2)\text{COS}(W_x t) -$$

$$M_x I_{rx}W_s\text{SIN}(W_s t + Q_{rx} + Q_2)\text{SIN}(W_x t)$$

since $W_x >> W_s$:

$$(d/dt)(F_{asx}) =$$

$$+L_{sx}I_{sx}W_x\text{COS}(W_s t + Q_{sx})\text{COS}(W_x t) +$$

$$M_x I_{rx}W_x\text{COS}(W_s t + Q_{rx} + Q_2)\text{COS}(W_x t)$$

The Terminal Voltage Relation of the HFRT, which includes the resistive voltage drop, becomes:

$$V_{asx} = (L_{sx}W_x)I_{sx}\text{COS}(W_s t + Q_{sx})\text{COS}(W_x t) +$$

$$M_x I_{rx}W_x\text{COS}(W_s t + Q_{rx} + Q_2)\text{COS}(W_x t) +$$

$$R_{sx}I_{sx}\text{COS}(W_s t + Q_{sx})\text{SIN}(W_x t)$$

After demodulating (or multiplying the modulated signal by a "time sliced function" of the carrier signal $\text{SIN}(W_x t)$), the Terminal Voltage Relation becomes:

$$V_{asx} = (1/4)L_{sx}W_x I_{sx}[(+/-)\text{SIN}(W_s t + Q_{sx}) -$$

$$\text{SIN}(W_s t + Q_{sx}) - 2W_x t)(+/-)\text{SIN}(W_s t + Q_{sx})) +$$

$$\text{SIN}(W_s t + Q_{sx}) + 2W_x t)] +$$

$$(1/4)M_x I_{rx}W_x[(+/-)\text{SIN}(W_s t + Q_{rx} + Q_2) -$$

$$\text{SIN}((W_s t + Q_{rx} + Q_2) - 2W_x t)(+/-)\text{SIN}((W_s t +$$

$$Q_{rx} + Q_2)) + \text{SIN}((W_s t + Q_{rx} + Q_2) + 2W_x t)] +$$

$$(1/4)R_{sx}I_{sx}[\text{COS}(W_s t + Q_{sx}) - \text{COS}((W_s t + Q_{sx}) + 2W_x t) +$$

$$\text{COS}((W_s t + Q_{sx})) - \text{COS}((W_s t + Q_{sx}) - 4W_x t)]$$

The (+/-) option in the previous relation is the result of using a synchronous balanced demodulator which gates (i.e., ON or OFF), the "carrier" current or voltage signals at the zero crossing of their amplitudes. As a result, the negative and positive frequency terms of $W_s$ can be combined at unipolar half periods of the sampling (or carrier) frequency.

Upon filtering the high frequency terms containing $2W_x$ and $4W_x$, etc., which are harmonics of the carrier frequency, the Terminal Voltage Relation becomes:

$$V_{asx} = (1/2)(L_{sx}W_x)I_{sx}\text{SIN}(W_s t + Q_{sx}) +$$

$$(1/2)M_x I_{rx}W_x\text{SIN}(W_s t + Q_{rx} + Q_2) +$$

$$(1/2)R_{sx}I_{sx}\text{COS}(W_s t + Q_{sx})$$

The high frequency components are reduced by the inherent filtering capabilities of the REG, particularly when operating under resonance, and by the inherent filtering capabilities of the low frequency PGM.

By the same analysis as previously performed on $V_{asx}$, it follows that the Terminal Voltage Relations of the HFRT are:

$$V_{asx} = (1/2)(L_{sx}W_x)I_{sx}\text{SIN}(W_s t + Q_{sx}) + \quad \text{(eq. 48)}$$
$$(1/2)M_x I_{rx} W_x \text{SIN}(W_s t + Q_{rx} + Q_2) +$$
$$(1/2)R_{sx} I_{sx} \text{COS}(W_s t + Q_{sx});$$

$$V_{bsx} = (1/2)(L_{sx}W_x)I_{sx}\text{COS}(W_s t + Q_{sx}) + \quad \text{(eq. 49)}$$
$$(1/2)M_x I_{rx} W_x \text{COS}(W_s t + Q_{rx} + Q_2) +$$
$$(1/2)R_{sx} I_{sx} \text{SIN}(W_s t + Q_{sx});$$

$$V_{arx} = (1/2)(L_{rx}W_x)I_{rx}\text{SIN}(W_r t + Q_{rx}) + \quad \text{(eq. 50)}$$
$$(1/2)M_x I_{sx} W_x \text{SIN}(W_r t + Q_{sx} - Q_2) +$$
$$(1/2)R_{rx} I_{rx} \text{COS}(W_r t + Q_{rx});$$

$$V_{brx} = (1/2)(L_{rx}W_x)I_{rx}\text{COS}(W_r t + Q_{rx}) + \quad \text{(eq. 51)}$$
$$(1/2)M_x I_{sx} W_x \text{COS}(W_r t + Q_{sx} - Q_2) +$$
$$(1/2)R_{rx} I_{rx} \text{SIN}(W_r t + Q_{rx});$$

where:

$W_s$ is the electrical angular frequency of the power supply and is the modulation angular frequency of the HFRT stator;

$W_r$ is the electrical angular frequency of the modulation of the rotor signal and is equal to $(W_s - W_m)$;

$W_x$ is the electrical angular frequency of the carrier of the modulation;

$Q_{sx}$ is the electrical angular displacement of the stator modulation;

$Q_{rx}$ is the electrical angular displacement of the rotor modulation;

$Q_2$ is the mechanical angular displacement of the rotor;

$M_x$ is the mutual inductance of the HFRT and is equal to $N_{sx}N_{rx}L_{mx}$;

$L_{sx}$ is the stator inductance of the HFRT and is equal to $N_{sx}N_{sx}(L_{mx}+L_{1sx})$ $L_{rx}$ is the rotor inductance of the HFRT and is equal to $N_{rx}N_{rx}(L_{mx}+L_{1rx})$ $R_{rx}$ and $R_{sx}$ are the rotor and stator electrical resistance of the HFRT (respectively)

There are several mathematical equations that characterize the behavior of this system. These relations are:

a. Torque of the PGM equals:
$(P/2W_s)(V_{in}^2/2M_xW_x)(M/2L_s)(A)\text{COS}(Q_{user})$;

b. The PGM Mechanical Power equals:
$(W_m P/2W_s)(V_{in}^2/2M_xW_x)(M/2L_s)(A)\text{COS}(Q_{user})$ c. The Active Electrical Power of the machine equals:
$(W_m P/2W_s)(V_{in}^2/2M_xW_x)(M/2L_s)(A)\text{COS}(Q_{user}) +$ $(1/8M_x^2 W_x^2)(R_r)A^2 V_{in}^2$;

d. Total Reactive Electrical Power of the machine equals:
$-(W_m P/2W_s)(V_{in}^2/2M_xW_x)(M/2L_s)(A)\text{SIN}(Q_{user}) -$ $(1/8M_x^2 W_x^2)(R_r)((1 - W_m P/2W_s)W_s L_L + P_{rx})A^2 V_{in}^2$;

e. The Power Factor of the machine equals:
$+(1/8M_x^2 W_x^2)((1 - W_m P/2W_s)W_s L_L + p_{rx})A^2 V_{in}^2 =$ $(W_m P/2W_s)(V_{in}^2/M_xW_x)(M/2L_s)(A)\text{SIN}(Q_{user}) =$ $[(PF - 1)/PF][W_m P/2W_s)(V_{in}^2/M_xW_x)(M/2L_s)(A)\text{COS}(Q_{user})) +$ -continued $(1/8M_x^2 W_x^2)(R_r) A V_{in}^2]$;

where:

$W_s$ is the angular frequency (radians/sec) of the electrical power source;

$W_x$ is the angular frequency (radians/sec) of the carrier signal;

$W_m$ is the angular frequency (radians/sec) of the rotor;

P is the number of electrical poles of the machine;

$V_{in}$ is the voltage amplitude of the electrical power source;

PF is the power factor of the machine;

$M_x$ is the mutual inductance of the REG;

M is the mutual inductance of the PGM;

$L_s$ is the self inductance of the PGM stator;

$L_L$ is the leakage inductance of the PGM:

$R_r$ is the rotor resistance;

$P_{rx}$ is the REG carrier frequency impedance;

A is the user selectable amplitude of the REG modulation;

$Q_{user}$ is the user selectable common phase shift of the REG amplitude;

Given the above discussion of the basis operation of the electric machine system of the present invention, it is useful to further examine several novel aspects of this system in more detail. Hence, the discussion will now focus on the modulation strategies employed by the modulator 14. The electronic modulator may be a common pulse width modulation (PWM) variety having the option of employing additional efficiency and enhancing techniques such as resonant switching technology. Furthermore, alternative modulation strategies such as matrix switching, amplitude modulation and frequency modulation are all viable modulation approaches for this invention. Still further, pulse density modulation may be employed and is perhaps the best option for facilitating the use of the resonant switching technology.

To understand the application of resonant switching technology to the electric machine system of the present invention, it is helpful, first, to look at the state of the magnetic fields involved in the system which in this case, utilizes a single phase carrier. In particular, unlike the synchronized moving magnetic fields of the PGM, the magnetic field of the REG rotor and stator do not move, but only change field amplitude at the carrier frequency, $W_x$. Specifically, all the phase windings of the REG are excited by a high frequency carrier signal of the same phase. Because the frequency of the carrier signal is significantly greater than the frequency of the modulator signals, the rotor of the REG barely appears moving to the high frequency magnetic field produced by the carrier signals. Essentially, the REG is acting as a classical electrical transformer operating under single phase principles and at the carrier frequency $W_x$.

The effective impedances of the self inductance terms, $L_{sx}W_x$ and $L_{rx}W_x$, where $L_{sx}$ is the self inductance term of the stator of the REG at its high frequency of operation (i.e., the carrier frequency $W_x$), can be modified by strategically placing resonating capacitors either in series or in parallel with these self inductance terms. Because of the high frequency of operation of the carrier signal $W_x$, the electrical capacitance and the physical size of these resonating capacitors is small.

The frequency of resonance occurs when:

$$(W_x)^2 = (W_r)^2 = 1/(LC)$$

where:
  $W_r$ is the resonance frequency of the circuit;
  L is the inductance of the resonating circuit; and
  C is the capacitance of the resonating circuit.

After implementing the series placed method of resonance with a resonating capacitor, $C_x$, the previously described self inductance terms act as a band pass filter and their effective impedances are as follows:

at $W_r$ (I.e., the resonance frequency)
  $(L_x W_r - 1/C_x W_r)$ approaches zero impedance;

at $W_s$ (the utility frequency):
  $(L_x W_s - 1/C_x W_s)$ approaches infinite capacitive impedance, and at $W_x$ (the carrier frequency):
  $(L_x W_x - 1/C_x W_x)$ approaches infinite inductive impedance Similarly, in implementing the parallel placed method of resonance with a resonating capacitor, $C_x$, the self inductance terms act as a band pass filter and their effective impedances can be expressed as follows:

at $W_r$:
  $(1/(C_x W_r) - 1/L_x W_r))$ approaches zero admittance;

at $W_s$:
  $(1/(C_x W_s) - 1/L_x W_s))$ approaches infinite capacitive admittance; and at $W_x$:
  $(1/(C_x W_x) - 1/L_x W_x))$ approaches infinite inductive admittance It can, thus, be seen under resonance, the REG serves as a band pass filter to block the low frequency components (i.e., the modulation frequency $W_s$) and passes the high frequency component (i.e., the carrier frequency $W_x$). Further, it serves to block the harmonics of the carrier frequency (e.g., $2W_x$, $4W_x$, ...). As a result of this filtering effect, the resonant switching technology can significantly alter the effects of the self inductance terms.

In addition, it may be beneficial to institute additional inductance into each phase of operation to decrease the size of the capacitors needed to implement resonance rather than depending solely on the leakage inductance of the REG. With the addition of mutual windings, these additional inductors may function as current sensor for the control electronics. Although these additional inductors are separate from the leakage inductance of the REG, they may be integrated into the structure of the REG. Further benefits realized by the resonance switching are that it greatly reduces the electrical losses and stresses of the high frequency electrical and electronic components of the REG such as power semiconductors. It also allows the otherwise parasitic parameters of the machine such as leakage inductances and capacitances to be part of the tuned electrical circuit.

Another novel aspect of the present invention is that the HFRT and the PGM are mirrored electromagnetic images of each other with one exception. The exception is that the HFRT is designed for operation in much higher electrical frequency than the PGM. As such, the HFRT is physically smaller than the PGM, and it has a much lower electrical impedance. Both rotors of the PGM and the HFRT are attached to the same body and move at the same mechanical phase and velocity. By suggesting that the HFRT and PGM are mirrored electromagnetic images, it is meant that they exhibit similar air gap magnetic field distributions which are proportional in magnitude when their field windings are excited by polyphase signals of the same frequency. It does not necessarily mean they have the same arrangement or number or position of phase windings, although this would be normal.

Figure 5A:
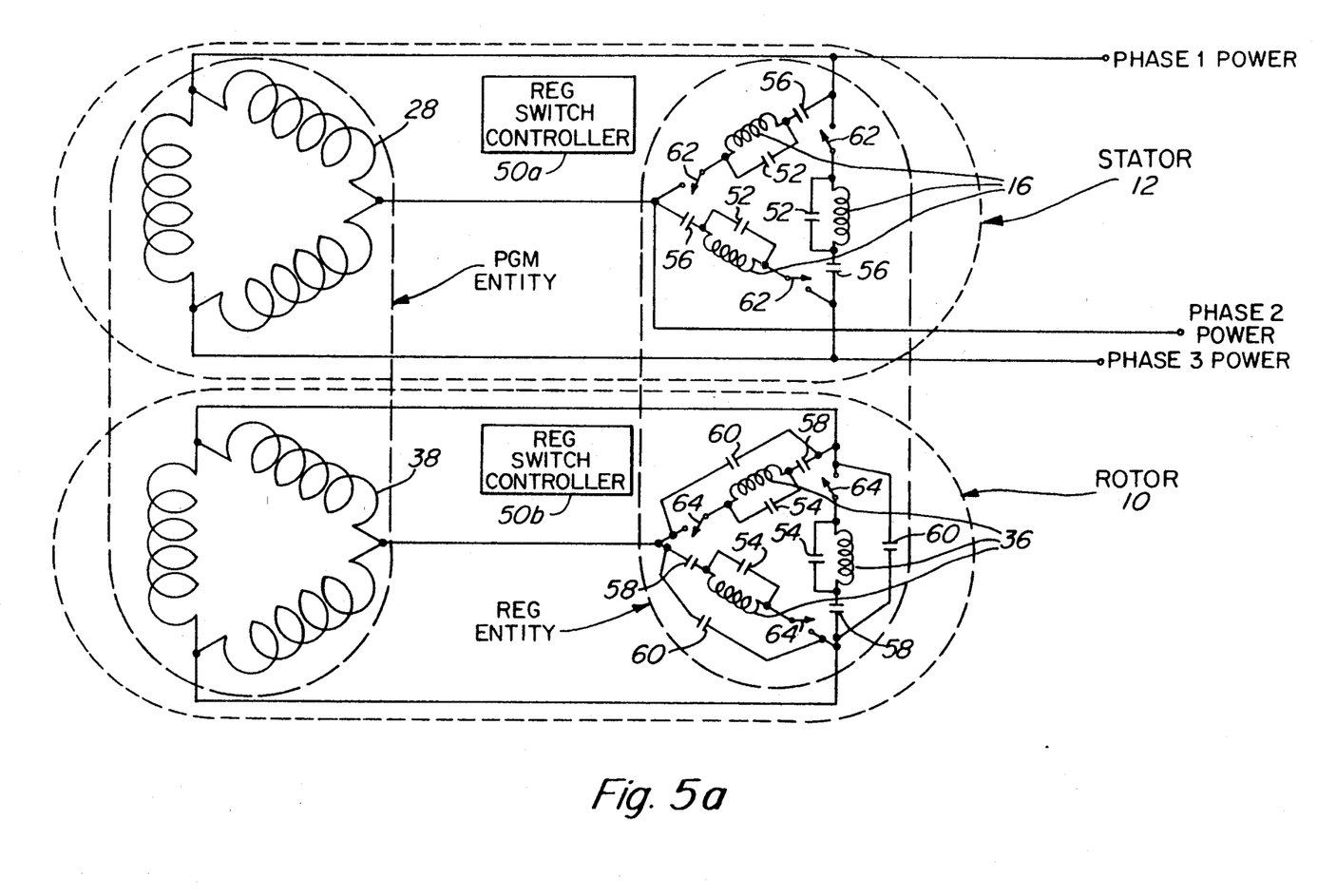
FIG. 5a is an electrical schematic of a first embodiment of the present invention.
Figure 5B:
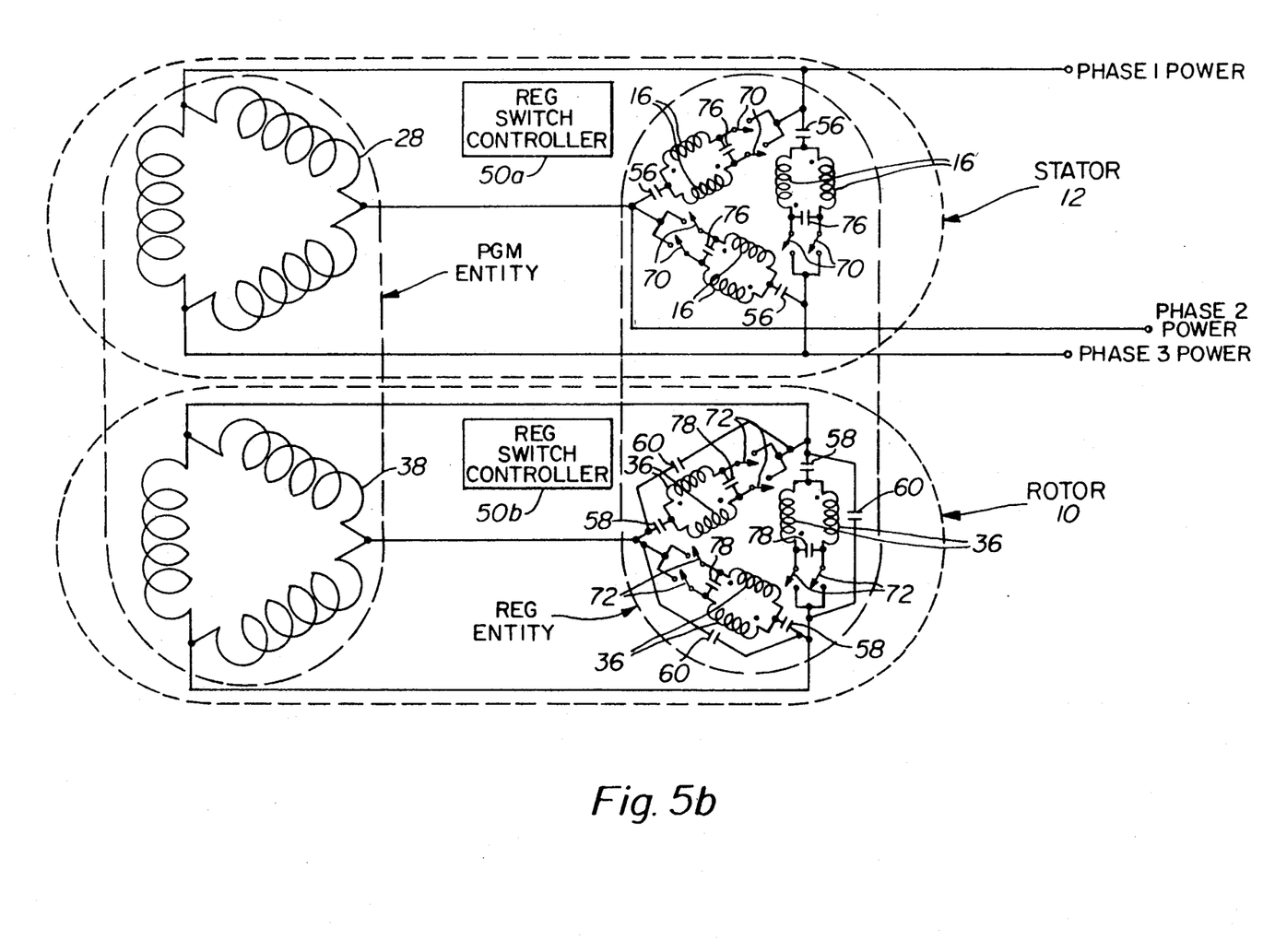
FIG. 5b is an electrical schematic of a second embodiment of the present invention.
Figure 5C:
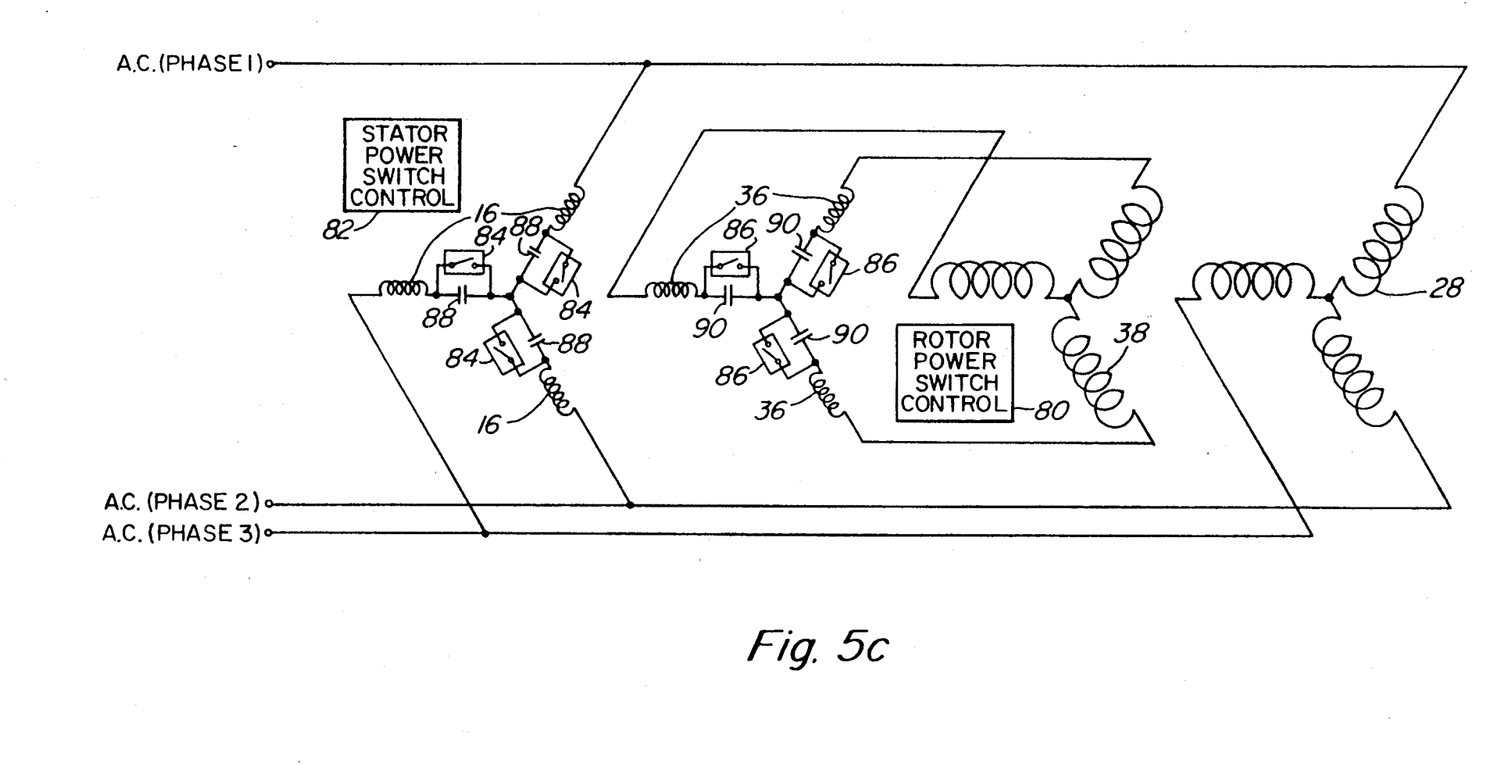
FIG. 5c is an electrical schematic of a third embodiment of the present invention.

FIGS. 5a, 5b and 5c show more detailed electric schematics of apparatus for implementing the above described concepts using zero current resonant switching. FIG. 5a is an electrical schematic that utilizes a unipolar synchronous modulator and demodulator. As can be seen in FIG. 5a, the rotor 10 has windings 38 like that shown in FIG. 1, except that the windings are connected in a delta configuration as opposed to a wye configuration. Furthermore, the rotor has windings 36. The stator, on the other hand, has windings 28 and winding 16. All of these windings are connected in a delta configuration as opposed to a wye configuration.

In addition, resonating capacitors 52 are provided on the stator, and resonating capacitors 54 are provided on the rotor 10. Each resonating capacitor 52 and 54, in combination with the leakage inductance of its designated phase winding, implements a resonating circuit whose frequency of resonance is the carrier frequency $W_x$. The resonating capacitors are selected so that the combined circuit, which is the resonating capacitances and leakage inductance of the HFRT rotor and stator, becomes a resonating circuit. To decrease the size of the resonant capacitor, 52 and 54, additional inductors could be placed in series (or parallel) with the windings, 6 and 36, as mentioned earlier. The capacitors 56 on the stator and 58 on the rotor block the low frequency component (i.e., the utility frequency, $W_x$). These capacitors, however, are not mandatory because the HFRT voltage and currents are always referenced and synchronized to the power grid regardless of the mechanical speed. Lastly, capacitors 60 on the rotor bypass the high frequency component (i.e., the carrier frequency $W_x$). They likewise are not a required component. Some additional variation to the circuit, figure 5a, 5c, 5d, 6, and 7, may be needed for electrical integrity, such as flyback diodes, etc.

Switches 62 are employed on the stator 12, and switches 64 are employed on the rotor 10. These switches are bi-directional of power switches which implement unipolar synchronous modulation and demodulation functions on the high frequency carrier to reproduce and pass the low frequency component. By judiciously selecting the on and off times of the power switches 62 and 64 at the carrier frequency, the stored energy in the resonating circuit is passed to the rotor winding 38. The switches are controlled, on the stator, by the switch controller 50a and on the rotor, by the switch controller 50b.

FIG. 5b depicts a bipolar implementation of the system which uses bipolar synchronous modulator/demodulators. This implementation is much like the implementation of FIG. 1 except that the windings 16 are organized in pairs as are the windings 36. Each of the windings 16 on the stator 12 is center tapped and driven by a set of bi-directional switches 70. Each bi direction power switch 70 is realized by using two conventional power semiconductor devices such as two SCRs or MCTs in parallel or in series with opposite polarity connections. With the use of resonant technology, the bi-directional power switches 70 switch polarity at the zero crossing points of the voltage (or current amplitudes) of the carrier signal. For the given circuit, each bi-directional switch 70 remains on; once per carrier frequency period and remains on for a portion of the carrier frequency period between the zero crossing points of the current and voltage amplitudes to carrier. Switches 72 are, likewise, provided for the pairs of windings 36. These switches 72 are at opposite half cycles of the carrier frequency period of the switches 70.

Resonating capacitors 76 are provided on the stator 12 and resonating capacitors 78 are provided on the rotor 10. These capacitors 76 and 78 may serve also as commutation capacitors for their corresponding bi-directional switches 70 and 72, respectively. The capacitors 56, 58 and 60 serve the same roles that their counterparts serve in implementation of FIG. 5a and may be optional. The switches are, once again, controlled by controllers 50a and 50b, respectively.

FIG. 5c presents yet another embodiment that adopts a unipolar implementation using zero voltage resonant switching. This embodiment includes the PGM windings 28 and 38 configured in a wye configuration. It also includes windings 16 and 36 for the HFRT of the REG configured in the wye configuration. The windings 16 and 36 for the HFRT of the REG are provided with bi-directional switches 84 and 86, respectively. The switches on the rotor adjacent to the windings 36 are controlled by the rotor power switch control 80, whereas the switches 84 on the stator located adjacent to the windings 16 are controlled by the stator power switch control 82. Capacitors 88 are provided on the stator, and capacitors 90 are provided on the rotor as shown in FIG. 5c.

Figure 6:
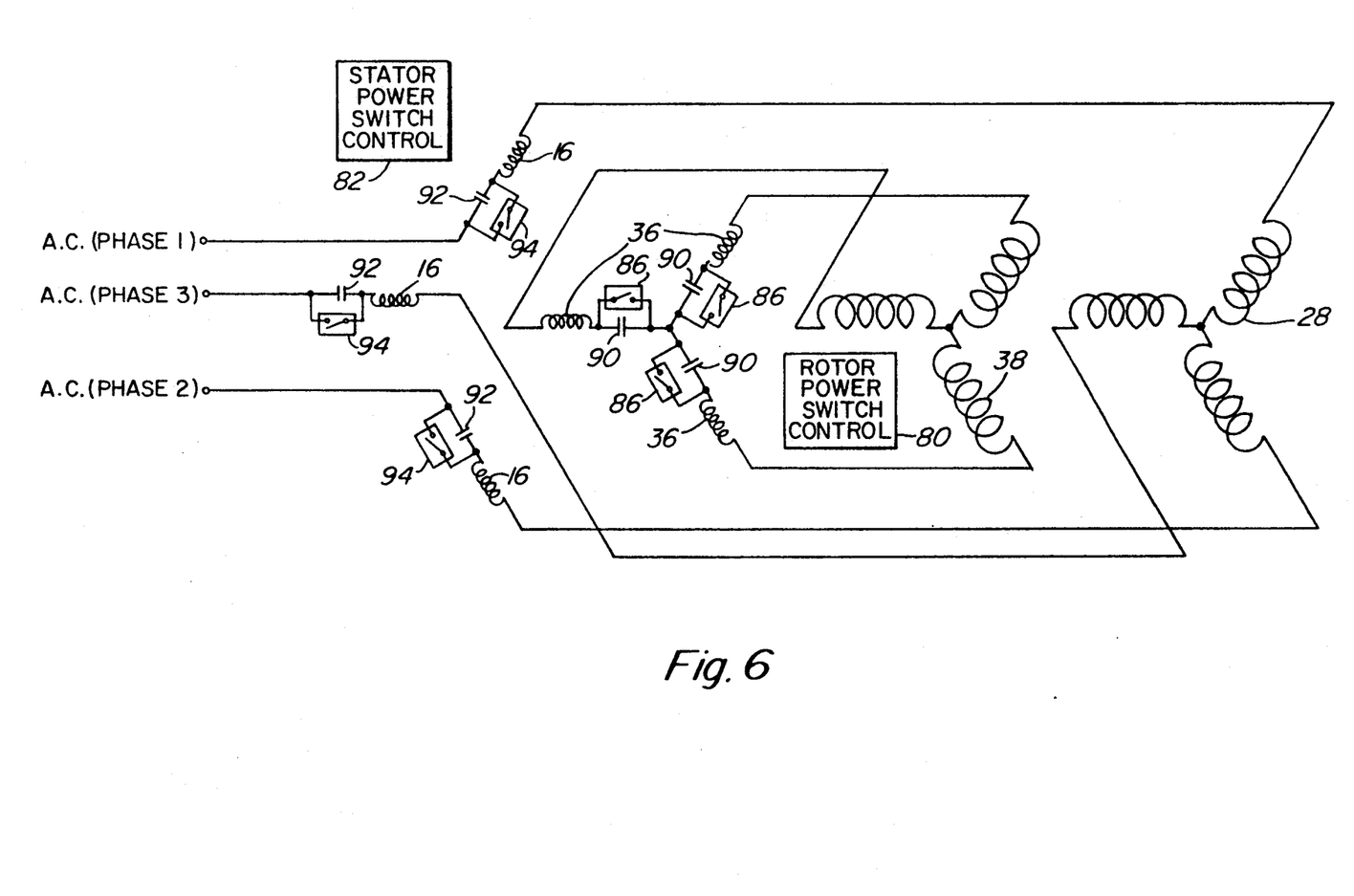
FIG. 6 is an electrical schematic of a fourth embodiment of the present invention.

Another alternative embodiment is depicted in FIG. 6. This is an embodiment that can be configured for a unipolar or a bipolar implementation. It is shown in FIG. 6 for a unipolar implementation. In accordance with this arrangement, the REG stator windings 36 are in series with the PGM stator windings 38. Further, the inductors 16 for the PGM which are located on the stator are not interconnected in a wye configuration; rather, they are kept separate in a non connected fashion and directly coupled to respective windings of the PGM stator winding 28. The inductors 16 are connected in series with switches 94 and capacitors 92 using zero voltage resonant switching. As mentioned above, switches 94 are depicted as unipolar switches but they may, likewise be bipolar switches.

Figure 7:
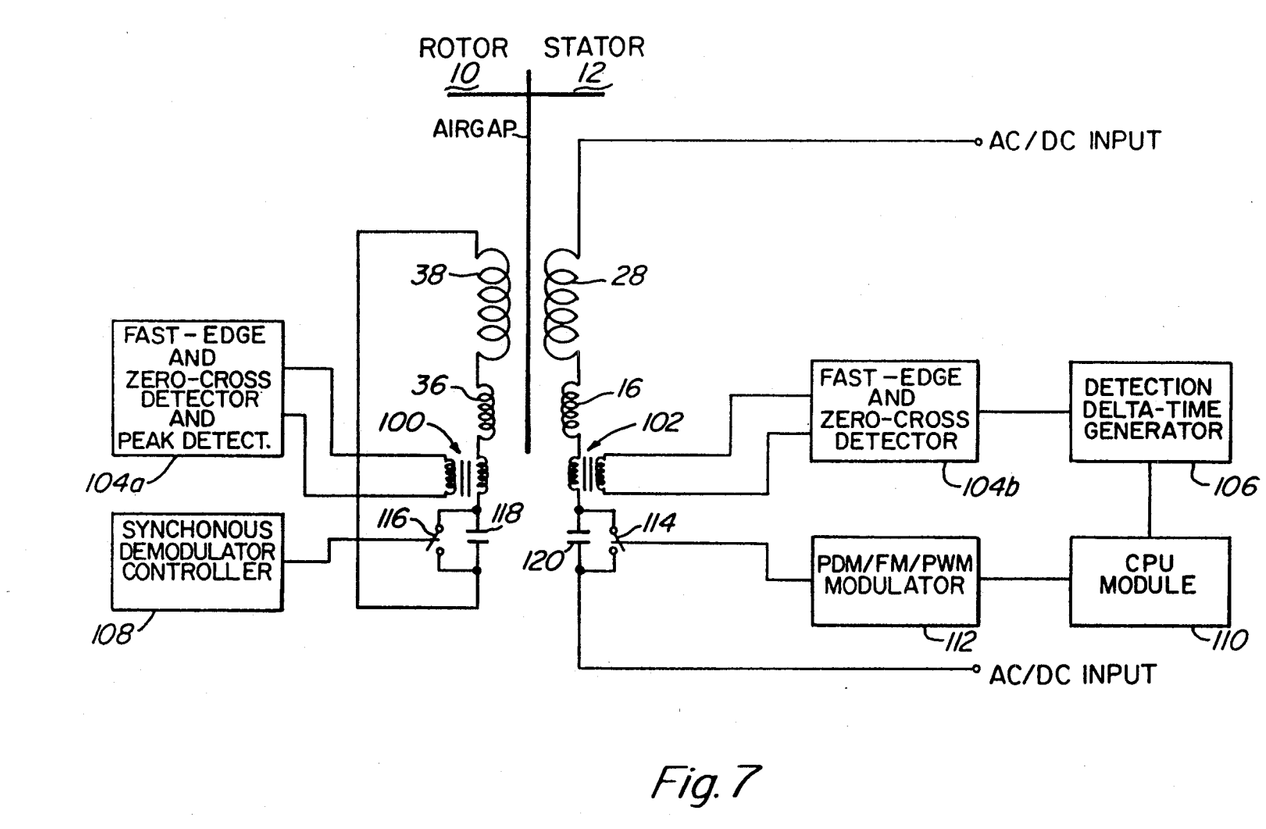
FIG. 7 is a block diagram depicting the major components required for the electric machine system of the present invention to implement resonant switching.

FIG. 7 shows implementation of a system for implementing the rotating machine with zero voltage resonant switching. This block diagram shows a single phase of a possibly multiple phase winding arrangement. The rotor side of the arrangement is composed of a PGM rotor winding 38 and a HFRT rotor winding 36. The rotor side of the system also includes a resonant inductor with an integrated current sensor 100. In addition, the rotor side includes a fast edge and zero crossing point detector and peak (or level) detector 104a which is connected to the resonant inductor having an integrated current sensor 100. The detector 104a additionally connected to a synchronous demodulator controller 108. The demodulator controller 108 controls a switch 116. The switch 116 is a bi-directional power switch that is triggered at the zero crossing point of the carrier signal. The circuit having the switch 116 also includes a capacitor 118 which is a rotor resonant capacitor.

The stator side of the system shares man of the same type components as the rotor side. For instance, the stator side includes a PGM stator winding 28 and a HFRT stator winding 16. Furthermore, it includes a stator resonant inductor having an integrated current sensor 102. Still further, it includes a fast edge and zero crossing point detector 104b, a bi-directional power switch 114 and a resonant capacitor 120.

The stator side, however, differs from the rotor side in that it includes a detection delta time generator 106 that is connected to a CPU module 110. The CPU module 110 is in turn, connected to a modulator 112 which may be a pulse density modulation (PDM), frequency modulation (FM), a pulse width modulation (PWM) type modulator or any modulation technique which carries electrical information and power.

The resonating circuits for this system are formed by the resonant inductors 100, 102 and capacitors 118 and 120. To understand the operation of the resonating circuits, it is useful to first examine the operation of the CPU module 110. The CPU module 110 selects the weighting for the modulation performed by the modulator 112. The CPU 110 also selects the frequency of the carrier signal and controls the on/off time for the power switch 114. The CPU 110 sends this control information as parameters to the modulator 112. The modulator, in turn, opens or closes the power switch according to the supplied parameters and generates an appropriate modulated signal.

The opening and closing of the power switches causes a secondary action in the current sensing windings of the inductors 102. If the switch closes before the zero crossing point of the voltage of the carrier signal, impulse on the current (fast edge) appears on the current sensor 104b. Frequencies much greater than the natural frequency are considered fast edge. In all cases, the current sense signal follows the voltage signal across the resonant capacitor 120 and crosses the zero and the voltage signal. The fast edge and zero crossing point detector 104b ensures that the switches are switched coincidently with the zero crossing points This fast-edge and zero crossing point event information is supplied to the delta time generator 106 by the detector 104b. The delta time generator 106 generates a time count between the fast edge and the zero crossing points. This information is then used by the CPU 110 to establish correcting pulse with information to the modulator 112 for correcting the switching time of the power switch. Therefore, compensation and correction of the inherent delays in the circuit between the turn on (and turn off) commands and the actual power switch response can be accomplished.

The resonant capacitor or inductor (as well as parasitical impedances) is effectively switched into or out of the resonant circuit by the on and off actions of the power switches (semiconductors). As a result, by judiciously selecting the on and off times of the power switches, the resonant frequency of the circuit may be actively changed. Essentially, the carrier frequency of the modulator must be substantially equal to the resonant frequency but as just suggested, the resonant frequency is adjustable. Changing the resonant frequency can have an important effect, such as adjusting the power factor of the electric machine system. This concept is inferred in the previous mathematical relations.

Similar activities occur on the rotor side of the system. In particular, the rotor has its own fast-edge and zero crossing point detector 104a which supplies information like that described aboe for detector 104b to the demodulator controller 108. This allows the demodulator controller to adjust the predicted time of when to turn the rotor power switch on and off for a zero crossing point coincidence. As such, the synchronous demodulator 108 can synchronize the operation of the switch to the zero crossing points.

While the present invention has been shown with respect to preferred embodiments thereof, those skilled in the art will know of other alternative embodiments which do not depart from the spirit and scope of the invention as defined in the appended claims.

I claim:

1. An electric machine system, comprising:
   a) a moving body;
   b) a stationary body adjacent to said moving body;
   c) a circuit, comprising:
      i) a first pair of windings, separated by an air gap, for generating a force to actuate said moving body comprising windings on the moving body and windings on the stationary body;
      ii) a second pair of windings, separated by an air gap, for altering excitation of the first pair of windings, said second pair of windings comprising windings on the moving body and windings on the stationary body;
      iii) a modulator for supplying at least one modulated carrier signal to one of the windings of the pairs of windings;
      iv) a demodulator for demodulating the carrier signal to produce demodulated information signals and for forwarding said demodulated information signals to one of the windings of the pairs of windings; and
   d) means for providing alternating current power to said modulator and to said windings of one of said pairs of windings; and
   e) a resonant switching system coupled to at least one of said windings for selecting a resonance frequency of at least a portion of the circuit, said resonant switching system comprising a resonant inductor and a resonant capacitor.

2. An electric machine system as recited in claim 1 wherein said resonant inductor is on said moving body.

3. An electric machine system as recited in claim 1 wherein said resonant capacitor is on said moving body.

4. An electric machine system as recited in claim 1 wherein said resonant capacitor is on said stationary body.

5. An electric machine system as recited in claim 1 wherein said resonant inductor is on said stationary body.

6. An electric machine system as recited in claim 1 wherein said resonant switching system further comprises a zero crossing detector for detecting a zero crossing point and switching means for switching the means for providing alternating current power on and off in response to the zero crossing detector.

7. An electric machine system as recited in claim 6 wherein said zero crossing detector detects the zero crossing point of voltage across the resonant capacitor.

8. An electric machine system as recited in claim 6 wherein said zero crossing detector detects the zero crossing point of current through the resonant inductor.

9. An electric machine system as recited in claim 6 further comprising:
   a fast edge detector for detecting a fast edge perturbation; and
   switching means responsive to said zero crossing detector and said fast edge detector for switching the means for providing alternating current off and on.

10. An electric machine system as recited in claim 6 further comprising:
    a level detector for detecting the voltage or current levels; and
    switching means responsive to said zero crossing detector and said level detector for switching the means for providing alternating current off and on.

11. An electric machine system as recited in claim 1 wherein the modulator is situated on the stationary body, and the demodulator is situated on the moving body.

12. An electric machine system as recited in claim 1 wherein the modulator is situated on the moving body, and the demodulator is situated on the stationary body.

13. An electric machine system as recited in claim 1 wherein the resonat switching system adopts a series placed resonance approach.

14. An electric machine system as recited in claim 1 wherein the resonant switching system adopts a parallel placed resonance approach.

15. An electric machine system as recited in claim 1 wherein the resonant switching system adopts a zero-current-switching approach.

16. An electric machine system as recited in claim 1 wherein the resonant switching system adopts a zero-voltage-switching approach.

17. An electric machine as recited in claim 1 wherein the stationary body of said first pair of windings is in series with the stationary body of said second pair of windings.

18. An electric machine as recited in claim 1 wherein the stationary body of said first pair of windings is in parallel with the stationary body of said second pair of windings.

19. An electric machine system as recited in claim 1 wherein said modulator generates multiple carrier signals that are phase shifted relative to each other and said demodulator sends said demodulated information signals resulting from the carrier signals to different respective windings in the first set of windings.

20. An electric machine system as recited in claim 19 wherein said modulator generates said multiple carrier signals such that the information signals are also phase shifted to provide polyphase excitation.

21. An electric machine system, comprising:
    a) a moving body;
    b) a stationary body adjacent to said moving body;
    c) a circuit comprising:
       i) a first pair of windings separated by an air gap, for generating a force to actuate said moving body, said first pair of windings comprising windings on the moving body and matched windings on the stationary body;
       ii) a second pair of windings separated by an air gap, for altering excitation of the first pair of windings, said second pair of windings comprising windings on the moving body and windings on the stationary body;
       iii) a modulator for supplying at least one modulated carrier signal to one of the windings of the pairs of windings, the frequency of said carrier signal being selected to be substantially equal to the resonance frequency of said circuit;
   iv) a demodulator for demodulating the carrier signal to produce demodulated information signals and for forwarding said demodulated information signals to one of the windings of the pairs of windings; and
d) means for providing power to said modulator and to said windings of one of said pairs of windings.

22. An electric machine system as recited in claim 21 wherein the modulator is situated on the stationary body and the demodulator is situated on the moving body.

23. An electric machine system as recited in claim 21 wherein the modulator is situated on the moving body and the demodulator is situated on the stationary body.

24. An electric machine system as recited in claim 21 wherein said modulator generates multiple carrier signals that are phase shifted relative to each other and said demodulator sends resulting demodulated information signals to different respective windings.

25. An electric machine as recited in claim 21 wherein the stationary body of said first pair of windings is in series with the stationary body of said second pair of windings.

26. An electric machine as recited in claim 21 wherein the stationary body of said first pair of windings is in parallel with the stationary body of said second pair of windings.

27. An electric machine system, comprising:
a) a moving body;
b) a stationary body adjacent to said moving body;
c) a first pair of windings, separated by an air gap, for generating a force to actuate said moving body, said first pair of windings comprising windings on the moving body and windings on the stationary body;
d) a second pair of windings, separated by an air gap, for altering excitation of the windings, said second pair of windings comprising windings on the moving body and windings on the stationary body wherein the moving body windings of said second pair of windings match the moving body windings of said first pair of windings and the stationary body windings of said second pair of windings match the stationary body windings of said first pair of windings, and the resulting air gap magnetic flux distribution for the second pair of windings when excited is substantially like the air gap magnetic flux distribution for the first pair of windings;
e) means for exciting the second pair of windings; and
f) a resonant switching system connected to at least one of said windings for selecting a resonance frequency for at least a portion of the system, said resonance switching system comprising a resonant inductor and a resonant capacitor.

28. An electric machine system as recited in claim 27 wherein each of said windings is connected in a wye configuration.

29. An electric machine system as recited in claim 27 wherein each of said windings is connected in a delta configuration.

30. An electric machine system as recited in claim 27 wherein said moving body windings are connected in a delta configuration and said stationary body windings are connected in a wye configuration.

31. An electric machine system as recited in claim 27 wherein said moving body windings are connected in a wye configuration and said stationary body windings are connected in a delta configuration.

32. An electric machine system as recited in claim 27 wherein said moving body windings are connected in a multiple delta configuration.

33. An electric machine system as recited in claim 27 wherein said moving body windings are connected in a multiple wye configuration.

34. An electric machine as recited in claim 27 wherein the stationary body of said first pair of windings is in series with the stationary body of said second pair of windings.

35. An electric machine as recited in claim 27 wherein the stationary body of said first pair of windings is in parallel with the stationary body of said second pair of windings.

36. An electric machine system as recited in claim 1 wherein the moving body rotates.

37. An electric machine system as recited in claim 1 wherein the moving body moves linearly.

38. An electric machine system as recited in claim 9 wherein the resonant switching system further comprises a means of measuring a time differential between the zero crossing detected by the zero crossing detector and the detected fast-edge purturbation.

39. An electric machine system as recited in claim 38 wherein the polarity of the measured time differential depends on a relative order in which zero crossing is detected and the fast-edge purturbation is detected.

40. An electric machine system as recited in claim 38 wherein the resonant switching system further comprises a clocking means for gating the switching means.

41. An electric machine system as recited in claim 37 wherein a voltage level or current level determines when to start the clocking means for gating the switching means.

42. An electric machine system as recited in claim 21 wherein the moving body rotates.

43. An electric machine system as recited in claim 21 wherein the moving body moves linearly.

44. An electric machine system as recited in claim 27 wherein the moving body rotates.

45. An electric machine system as recited in claim 27 wherein the moving body moves linearly.

46. An electric machine system as recited in claim 27 wherein the resonant switching system selects the resonance frequency to effect power factor and motion control.

* * * * *